(12) United States Patent
Stanger

(10) Patent No.: US 11,745,661 B2
(45) Date of Patent: Sep. 5, 2023

(54) OMNI-DIRECTIONAL SELF-ORIENTING BREAKAWAY STRUCTURES

(71) Applicant: Takie Adonis Stanger, Boise, ID (US)

(72) Inventor: Takie Adonis Stanger, Boise, ID (US)

(*) Notice: Subject to any disclaimer, the term of this patent is extended or adjusted under 35 U.S.C. 154(b) by 0 days.

(21) Appl. No.: 17/746,985

(22) Filed: May 18, 2022

(65) Prior Publication Data
US 2022/0274527 A1    Sep. 1, 2022

Related U.S. Application Data

(63) Continuation-in-part of application No. 17/000,325, filed on Aug. 23, 2020, now abandoned, which is a continuation-in-part of application No. 16/404,356, filed on May 6, 2019, now Pat. No. 10,773,766.

(60) Provisional application No. 62/666,850, filed on May 4, 2018.

(51) Int. Cl.
*B60R 1/076* (2006.01)
*B62J 23/00* (2006.01)
*B62J 29/00* (2006.01)

(52) U.S. Cl.
CPC ............ *B60R 1/076* (2013.01); *B62J 23/00* (2013.01); *B62J 29/00* (2013.01)

(58) Field of Classification Search
CPC ... B62J 17/02; B62J 17/04; B62J 23/00; B62J 29/00; B60R 1/076
See application file for complete search history.

(56) References Cited

U.S. PATENT DOCUMENTS

| | | | | |
|---|---|---|---|---|
| 1,828,804 A | * | 10/1931 | Horton | B60R 1/06 248/479 |
| 5,959,790 A | * | 9/1999 | Hempelmann | B60R 1/076 359/872 |
| 10,773,766 B2 | * | 9/2020 | Stanger | B62J 17/02 |
| 2009/0007720 A1 | * | 1/2009 | Tung | B62K 21/12 74/551.8 |
| 2012/0234129 A1 | * | 9/2012 | Adan | B62J 23/00 74/551.8 |
| 2020/0384921 A1 | * | 12/2020 | Stanger | B62J 29/00 |

FOREIGN PATENT DOCUMENTS

| | | | |
|---|---|---|---|
| DE | 1038427 B | * | 9/1958 |
| DE | 2857558 A1 | * | 7/1980 |
| EP | 0250177 A1 | * | 12/1987 |
| GB | 746275 A | * | 3/1956 |
| GB | 1234025 A | * | 6/1971 |

* cited by examiner

*Primary Examiner* — Adam D Rogers
(74) *Attorney, Agent, or Firm* — Innovative Law, PLLC; Steven M. Bertone

(57) ABSTRACT

An omni-directional self-orienting structure for a motorcycle, ATV, UTV, off road vehicle, snowmobile, bicycle or other vehicle. The structure extends from the vehicle and will deflect or breakaway under an applied force such as an impact, for example by a tree branch strike or crash. The structure can re-position and re-orient itself once the force is removed. Examples of the structure are hand guards, side mirrors, turn signals, extended lights, mounts and antennas. Apparatus and method claims are provided.

19 Claims, 7 Drawing Sheets

OMNI-DIRECTIONAL SELF-ORIENTING BREAKAWAY STRUCTURES

CROSS REFERENCE TO RELATED APPLICATIONS

The present application claims priority in and to U.S. patent application Ser. No. 17/000,325 filed Aug. 23, 2020, and further is incorporated herein by reference, which claims priority in and to U.S. patent application Ser. No. 16/404,356 filed May 6, 2019, and further is incorporated herein by reference, which claims priority in and to U.S. patent application 62/666,850 filed May 4, 2018, and further is incorporated herein by reference.

TECHNICAL FIELD

The presently disclosed technology relates to structures on vehicles that are capable of deflecting or breaking away under force, and thereafter self-orienting to their original position, and more specifically to hand guards, mirrors, turn signals, mounts or other fixtures extending from the body or chassis of a motorcycle, ATV, UTV, off road vehicle, snowmobile, bicycle or other vehicle.

BACKGROUND

Hand guards, side mirrors, turn signals, extended lights, mounts and other structures on motorcycles, ATVs, UTVs, off road vehicles, snowmobiles, bicycles, and other off-road vehicles serve important roles with respect to safety or other features. These functional structures that extend from an exterior of a vehicle come in a variety of sizes, shapes and materials.

One form of such a functional structure is a hand guard on a motorcycle in the form of convex outer surface guard typically made of plastic which protects a rider's hand from wind, mud, stones, gravel and other dangerous projectiles thrown by the rear wheels of vehicles in front. Such hand guards are also useful for protecting the user's hand from brush the rider may be passing through. Hand guards may also provide protection for the hand and brake and clutch levers when the rider is involved in an impact with a foreign object (e.g. tree branch) or a crash. Since other vehicles besides motorcycles also have handlebars, such as ATVs, off-road vehicles, snowmobiles, bicycles, and other wheeled, tracked or other vehicles, hand guards are also typically found on such vehicles.

Returning to hand guards, one unique safety concern with hand guards on handlebars is that in the case that the rider is thrown over the handlebars, the hands can become entrapped in the hand guards, which could cause severe injury, most commonly resulting in a broken wrist.

Prior art evidences a number of approaches to attempt to protect a user's hands from external injury such as rocks, trees or other objects which could strike a user's hands. However, the prior art fails to address the prospect that the user's hands are caught in the hand guard on an impact or crash. Therefore, prior art hand guards can become directly responsible for the injury of the user's hands, wrists or arms— opposite the purpose for which they are intended.

I have in fact suffered from such an impact and injury while riding a motorcycle with traditional hand guards. In fact, I broke my wrist due to my hand being caught in the traditional, non-breakaway hand guard upon a severe crash.

With that motivation, I previously created a first generation of flexible wraparound style hand guards, as evidenced by U.S. Pat. No. 9,499,225. That breakthrough hand guard served to address wraparound style hand guards, also known in the dirt biking community as "bark busters." However, what is needed in the art is a breakaway hand guard that is not a wraparound style, but an open-ended style.

With this in mind, I invented an open-ended style breakaway handguard. In developing this technology, I have also developed and invented similar advancements disclosed herein to adapt to side mirrors, turn signals, extended lights, tool mounts, antennas and other functional structures that extend from a vehicle, wherein the structure can breakaway upon impact, rather than bend, break or become nonfunctional.

For example, a side-by-side UTV off road vehicle may have side mirrors which extend from the outside of the vehicle, typically attached on the front of the roll cage or body of the vehicle. These side mirrors which extend beyond the body, roll cage or chassis are prone to being struck by branches, trees, rocks or other hazards while operating the vehicle on trails. When such an impact occurs, the side mirror or other structure may lose its functionality temporarily (e.g. until the user places the side mirror back in its original orientation), or worse there may be permanent damage to the functional structure rendering it inoperable and a hazard (e.g. a cracked or broken mirror or mirror housing).

Similarly, this new advancement can be applied to turn signals (e.g. on a motorcycle), extended lights (e.g. lights extending above an off road vehicle), mounts (e.g. for tools, electronic devices, etc.), antennas or other functional structures.

SUMMARY

The present disclosure describes apparatus directed to an omni-directional self-orienting breakaway structure (e.g. hand guards, side mirrors, turn signals, extended lights, mounts, antennas, etc.) suitable for a motorcycle, ATV, UTV, off road vehicle, snowmobile, bicycle or other conventional vehicle comprising such a functional structure extending from the vehicle.

In one aspect, embodiments of omni-directional self-orienting breakaway hand guards mounted on motorcycle handlebars are disclosed.

In another aspect, embodiments of omni-directional self-orienting breakaway side mirrors mounted on a roll cage of a UTV off road vehicle are also disclosed.

In other aspects, embodiments of omni-directional self-orienting breakaway structures such as lights, mounts and antennas mounted on exteriors of other vehicles are disclosed.

Methods of assembling a omni-directional self-orienting breakaway hand guard, side mirror or other structures are also disclosed.

BRIEF DESCRIPTION OF THE DRAWINGS

Embodiments of the invention are illustrated by way of example, and not by way of limitation, in the figures of the accompanying drawings and in which like reference numerals refer to similar elements, wherein.

DETAILED DESCRIPTION

Figure 1:
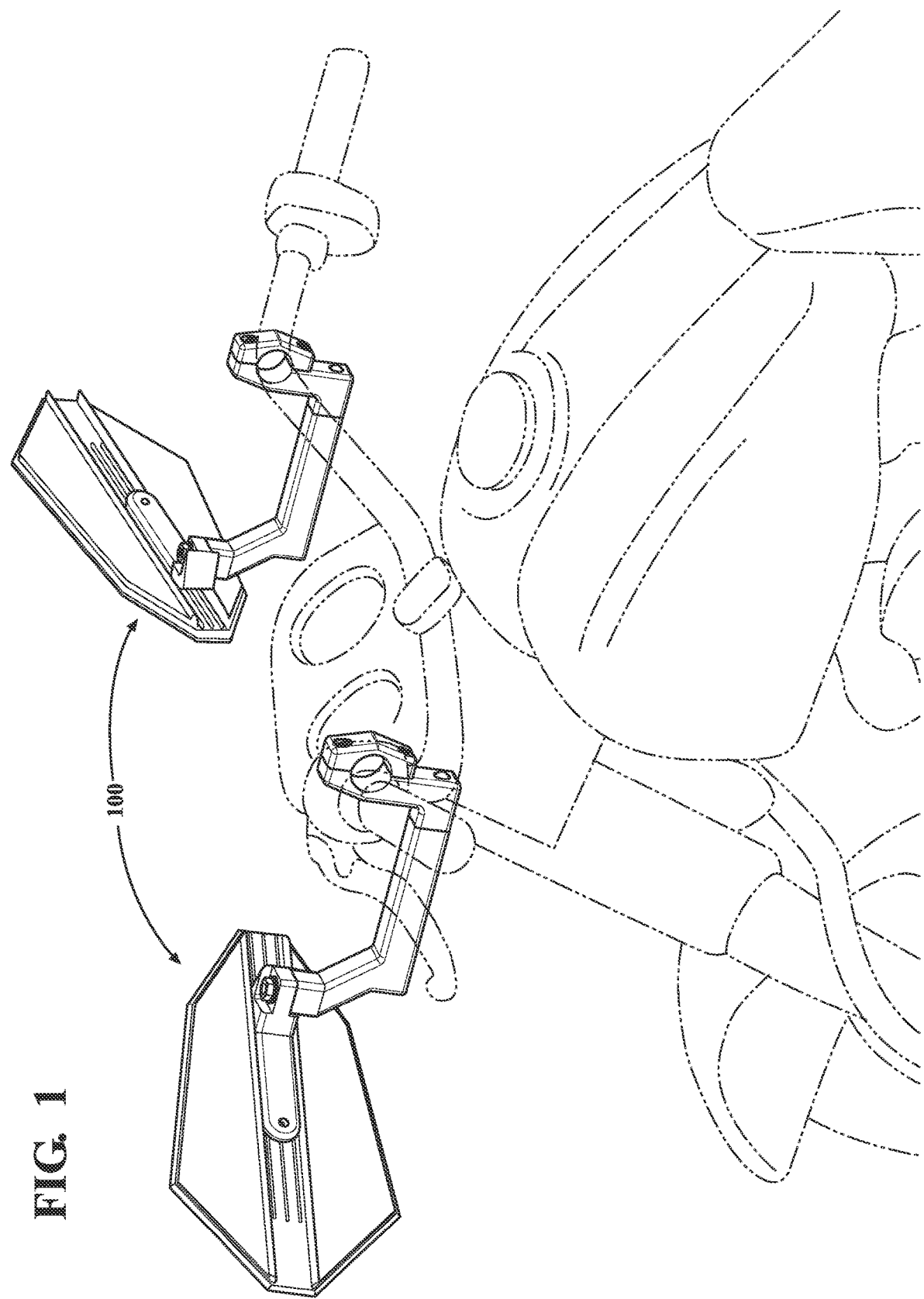
FIG. 1 is an environmental view of an embodiment of a pair of omni-directional self-orienting breakaway structures.

In the following description, for the purposes of explanation, specific details are set forth in order to provide a thorough understanding of the invention. However, it will be apparent that the invention may be practiced without these specific details. In other instances, well-known structures and devices may be depicted in block diagram form or simplified form in order to avoid unnecessary obscuring of the invention. Section titles and references appearing within the following paragraphs are intended for the convenience of the reader and should not be interpreted to restrict the scope of the information presented at any given location. As such, various aspects and features of example embodiments of the invention are described in more detail hereinafter in the following sections.

This disclosure presents my improved omni-directional breakaway structures for a vehicle such as a motorcycle, ATV, UTV, off road vehicle, snowmobile, bicycle or other vehicle, that is designed to disengage or breakaway in any direction necessary in the event of an impact to the structure. As noted above, the context of a motorcycle hand guard has been chosen to primarily demonstrate and illustrate embodiments of the present invention, but other vehicles, functional structures, trades and contexts can be applied without departing from the spirit of embodiments of the invention.

Embodiments of my disclosed invention are intended to be attached to a set of handlebars, a vehicle body, a roll cage, a frame a chassis or other exterior portion of the vehicle. Embodiments can be incorporated in manufacture of the vehicle, or alternatively bolted, screwed, welded, secured or attached with other conventional means to the vehicle.

Hand guard embodiments of the disclosed invention provide protection for a user's hand during ordinary use, while designed in extraordinary circumstances to breakaway when the hand guard is struck with a significant, active force such as an impact or crash. More particularly, when such an active force is applied to the hand guard from any direction (e.g. the hand, wrist or arm impacting it during a crash), my hand guard will disengage from its seated position on the handlebars. The active force can occur from any direction—and the handguard will disengage in a limited amount (e.g. for a limited distance and angle of deflection) in any direction—then return itself back to its original, resting, intended position once the force has been removed. The above described disengagement or breakaway state by the hand guard is intended to prevent the hand, wrist or arm from being injured by being stuck in the hand guard or any substantial impact against the hand guard. Thereafter, the hand guard returns to its original position.

In other embodiments such as side mirrors, turn signals, extended lights, mounts (e.g. tools, electronics, etc.) or antennas that extend from the vehicle, the above described disengagement or breakaway function allows the functional structure to deflect during impact and return to its original intended orientation and position. This reduces the potential for damage to the functional structure as well as maximizing its availability to function before, during and after such an impact.

Embodiments of the disclosed invention generally achieve omni-directional disengagement and self-orientation, without limitation, through the combination of a plurality (e.g. a pair) of mated surfaces or contact points held together by an axial central, preferably flexible shaft assembly. The flexible shaft assembly preferably comprises a plurality of solid cylindrical dowels (e.g. metal) at each end held together by a segment of flexible cable (e.g. metal) swaged into the end dowels. Of course, other flexible materials (e.g. rubber, plastic, composites, etc.) may be used with equal success for a flexible middle section, although a metal cable is described herein. Herein, if a "cable" is referenced throughout this disclosure, it is assumed that such a cable is not necessarily composed of metal and could be any conventional material used as a cable.

A spring offers tension or compression such that it communicates with the shaft assembly and thereby causes the pair of mated surfaces to be adjacent to one another in compression (via the tension or compression means). Of course, while a metal spring is a preferable option in my current prototypes, other conventional means of tension or compression can be implemented with equal success, such as non-metallic springs, elastomer, composite or rubber materials, etc. — any material which can offer substantial elastic tension or compression. Herein, if a "spring" is referenced throughout this disclosure, it is assumed that such a spring could be any conventional means for compression or tension.

When an active force such as an impact acts upon a breakaway structure (e.g. a mirror housing), the structure causes the pair of mated surfaces to absorb the impact, with the pair of mated surfaces acting as a fulcrum between the main chassis and the attachment member, or alternatively as a fulcrum between the main chassis and functional structure. As the pair of mated surfaces twist or disengage from one another, the deflecting force of the proximate expansion of the mated contact points is transferred to the shaft assembly, which, in turn, causes the tension or compression of the spring of the shaft assembly to increase. More succinctly, the structure flexes at its pair of mated surfaces, allowing them to disengage against one another under the increased compression or tension of the spring.

Once the active force (e.g. impact of a tree branch) is removed from the structure, the increased compression or tension of the spring in the breakaway state causes the shaft assembly to re-acquire to its lower compression resting position, or standard state, causing the plurality of contact points to self-orient and resume the original desired orientation and position where the compression or tension of the spring is lowest. For example, in embodiments a side mirror of a side-by-side UTV can be struck by a tree branch, breakaway and deflect during the impact, and then return to its original orientation and position automatically without damage.

Various materials can be used for the components of embodiments of the disclosed invention, such as metal, plastic, carbon or other conventional manufacturing materials. The flexible cable used in the shaft assembly can be many materials such as wire rope steel cable, composite cable, rubber or other conventional flexible material, where the material is somewhat flexible and allows the shaft assembly to flex slightly when force is applied.

In addition, many types of material can be used in order to create the hand guard or functional structure. Metals such as aluminum or stainless steel or other sufficiently strong metals can be used as well as other materials, such as carbon fiber, plastics, or other alloys or combinations thereof. It may be further advantageous to attach a plurality of structures (e.g. multiple turn signals) to a vehicle chassis (e.g. both left and right sides of a motorcycle frame). In this configuration the second structure (e.g. right turn signal) is preferably a mirror image of the first structure (e.g. left turn signal).

It is also noted that the placement of the spring (or other material providing tension or compression) can be placed at alternate positions along or in the shaft assembly. In fact, some embodiments can be anticipated where the spring and shaft assembly are external to the main chassis or attachment member, providing for various changes due to the nature of the application (e.g. motorcycle, ATV, UTV, snowmobile, bicycle, etc.).

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concepts are capable of modification in various obvious respects all without departing from the inventive concepts. Accordingly, the drawings and description of the preferred embodiments are to be regarded as illustrative in nature, and not as restrictive in nature.

DISCUSSION OF THE FIGURES

FIG. 1 is an environmental view of an embodiment of a pair of omni-directional self-orienting breakaway hand guards 100 configured on a motorcycle.

Figure 2:
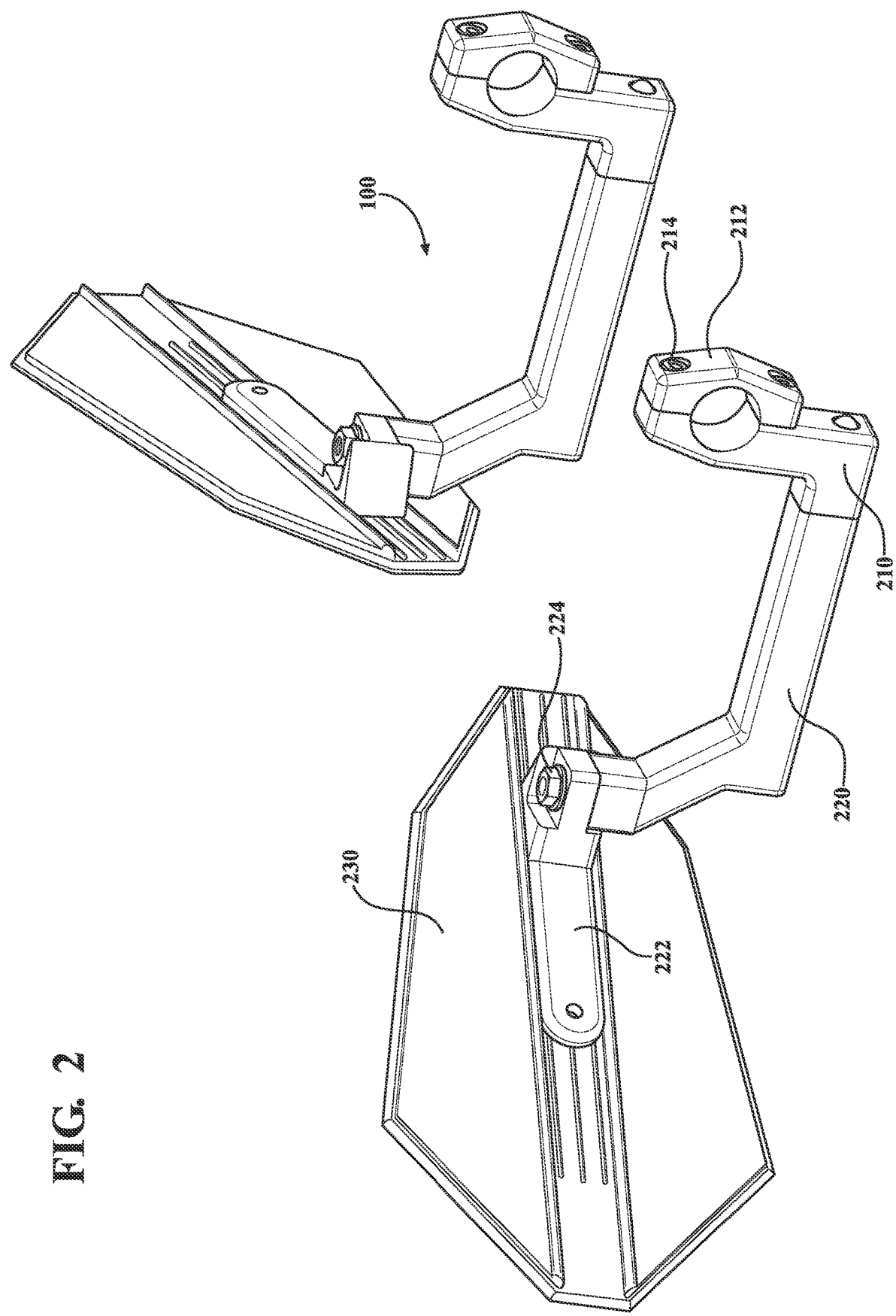
FIG. 2 is an orthographic view of an embodiment of a pair of omni-directional self-orienting breakaway structures.

FIG. 2 is an orthographic view of an embodiment of a pair of omni-directional self-orienting breakaway hand guards 100 similar to those illustrated in FIG. 1. The breakaway hand guard 100 comprises a handlebar clamp attachment member 210, a handlebar clamp 212, one or more handlebar clamp bolts 214, a main chassis 220, a shield attachment member 222, a shield attachment member bolt 224 and a shield 230.

The handlebar clamp attachment member 210 may be attached to a handlebar (as illustrated in FIG. 1) via the handlebar clamp 212, secured by one or more handlebar clamp bolts 214. Other conventional attachment means may be used to secure the handlebar clamp 212 to a handlebar (e.g. direct bolt, alternate hardware not utilizing a clamp, adhesive, weld, etc.).

In alternate embodiments (not shown), the main chassis 220 may incorporate the handlebar clamp attachment member 210 or other components.

The main chassis 220 and handlebar clamp attachment member 210 are illustrated in a resting standard state. The main chassis 220 may be proximate to and communicate with the handlebar clamp attachment member 210. The main chassis 220 may be selectively secured to the shield attachment member 222 with a shield attachment member bolt 224 or other conventional means (e.g. locking hardware, pinned, adhesive, weld, etc.). As the main chassis 220 and the shield attachment member 222 may be rotatably secured to one another, the shield attachment member 222 may be placed in a position or orientation relative to the main chassis before securing with the shield attachment member bolt 224. In other embodiments (not shown), the shield attachment member 222 and the main chassis 220 may be a single structure without the capability of rotational adjustment.

In alternate embodiments (not shown), the shield attachment member 222 and related shield components may be incorporated into the main chassis 220. Likewise, the shield attachment member 222 may be substituted by a mirror assembly comprising a mirror and mirror housing (e.g. for a side mirror embodiment). Likewise, other components with turn signals, extended lights or mounts (e.g. tools, electronics, antenna, etc.) may be utilized in the place of the shield related components when embodiments are practiced in other contexts or scope, without departing from the spirit of embodiments of the presently disclosed invention.

Figure 3:
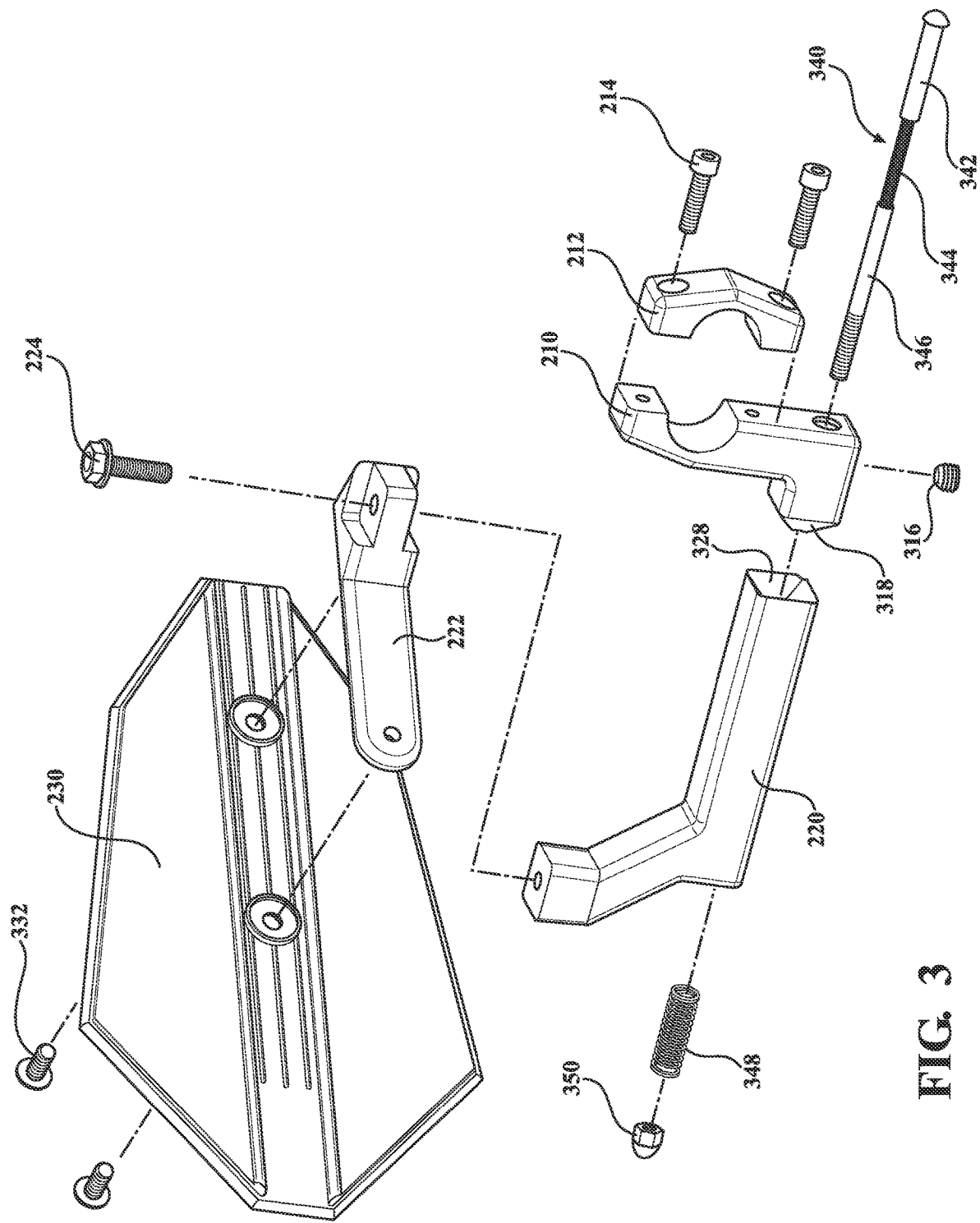
FIG. 3 is an exploded view of an embodiment of a pair of omni-directional self-orienting breakaway structures.

FIG. 3 is an exploded view of an embodiment of a pair of omni-directional self-orienting breakaway hand guards similar to the omni-directional self-orienting breakaway hand guards of FIGS. 1 and 2, wherein the individual components may be viewed separately rather than assembled in FIGS. 1 and 2.

The communication between the main chassis 220 and the handlebar clamp attachment member 210 occurs with a pair of mated surfaces 318 and 328, namely a first mated surface 318 on the handlebar clamp attachment member 210, and a second mated surface 328 on the main chassis 220. As illustrated, the first mated surface 318 may comprise a plug, or protruding/male shaped surface. The plug may be cylindrical or have multiple sides, facets or edges such as the shape of a pyramid (e.g. four-sided pyramid as illustrated). The second mated surface 328 as illustrated is a socket or recessed/female shaped surface, capable of accommodating the first mated surface 318.

In other embodiments, the male/female or plug/socket shaped surfaces may be reversed, such that the first mated surface 318 is a socket and the second mated surface 328 is a plug, without departing from embodiments disclosed herein. In yet other embodiments, the pair of mated surfaces do not need to resemble a plug/socket or male/female configuration and may be any complimentary pair of mated surfaces. Thus, any pair of mated surfaces may be utilized provided that when used in concert, the pair of mated surfaces encourage the handlebar clamp attachment member 210 and main chassis 220 to self-position and self-orient with respect to one another when under compression or tension (as described herein) between the handlebar clamp attachment member 210 and main chassis 220.

Further, the pair of mated surfaces can be situated in other locations (not shown) rather than between the main chassis 220 and handlebar clamp attachment member 210. For example, the main chassis 220 may alternatively be configured to communicate through a different pair of mated surfaces (not shown) with the shield attachment member 222, thus moving the mated surfaces to a different location but retaining the same omni-directional self-orienting breakaway function.

Similarly, in alternate embodiments (not shown), a pair of mated surfaces may be shared between a main chassis (e.g. which is attached to the vehicle) and a different functional structure such as a mirror assembly (e.g. a mirror and a mirror housing), a turn signal (e.g. a light and a light housing), an extended light, a mount (e.g. tool or electronic device) or an antenna mount, without departing from the spirit of embodiments of the presently disclosed invention. In such embodiments, the functional structure may take on a variety of contexts, yet still enjoy the omni-directional self-orienting breakaway advancements disclosed herein.

A shaft assembly 340 comprises a first end 342, a flexible middle portion 344 and a second end 346. The middle flexible portion 344 may be a cable as illustrated, wherein the cable of the flexible middle portion 344 is swaged to the first end 342 and swaged to the second end 346. Other attachment means rather than swaging may be used with success, including conventional hardware, pinning, adhesive, welding or other conventional means to attach a cable to a cylindrical/dowel shaped component.

The shaft assembly 340 is inserted, and passes through, the handlebar clamp attachment member 210 and the main chassis 220, and is secured therein.

The second end 346 may be threaded so as to accept a nut 350 and secure the shaft assembly 340 within the handlebar clamp attachment member 210 and the main chassis 220. A spring 348 may be inserted or placed around the shaft assembly 340 so as to create compression or tension between the handlebar clamp attachment member 210 and the main chassis 220. After the shaft assembly 340 is inserted or installed within the handlebar clamp attachment member 210 and main chassis 220, a set screw 316 may be installed to secure the shaft assembly 340 to the handlebar clamp attachment member 210.

The shield 230 may be secured to the shield attachment member 222 via one or more shield attachment bolts 332.

As raised earlier, if an alternate pair of mating surfaces (not shown) is located as between an alternate main chassis (not shown) and an alternate functional structure such as a side mirror (not shown), then a different shaft assembly (not shown) may be inserted through the different pair of mating surfaces created by that embodiment, without departing from the spirit of embodiments of the invention.

Figure 4:
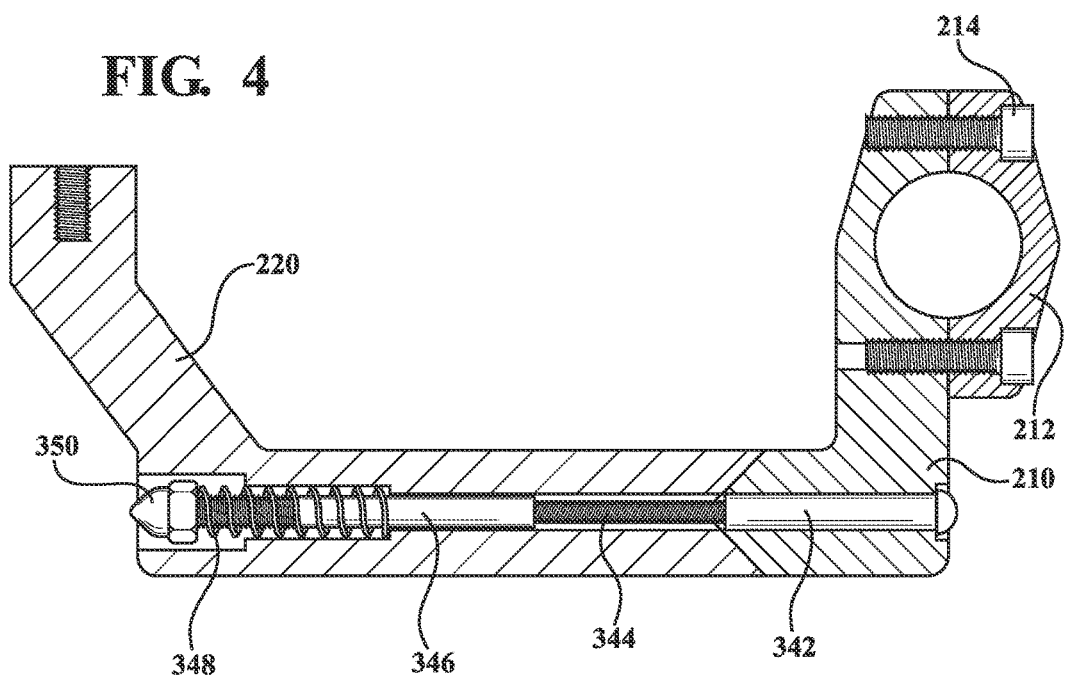
FIG. 4 is a cutaway view of an embodiment of a main chassis and attachment member in a resting standard state.

FIG. 4 is a cutaway view of an embodiment of a main chassis and handlebar clamp attachment member, similar to those disclosed in FIGS. 1-3, in a resting standard state. It is noted that in this figure, the handlebar clamp attachment member 210 and main chassis 220 are in the closest communication and proximity possible, with normal compression is exhibited on the spring 348, based on the normal length of the spring.

Under a significant force applied to the main chassis 220 (e.g. during a crash or other impact), the spring 348 installed upon the shaft assembly 340 will experience increased compression, allowing the first mated surface 318 and second mated surface 328 to disengage or otherwise deflect, extend and disorient from one another in a breakaway state. This disengagement or disorientation allows the hand guard to "breakaway" such that a user's hand will not be caught in the hand guard. In addition, such a breakaway feature allows the hand guard to be resistant to breakage or permanent bending as it can absorb impact.

It is noted that in alternate embodiments (not shown), the pair of mated surfaces may be designed to be as between a main chassis and a functional structure (e.g. shield assembly, mirror assembly, light assembly, mount assembly, etc.) rather than between a main chassis and a handlebar clamp assembly as illustrated.

Figure 5:
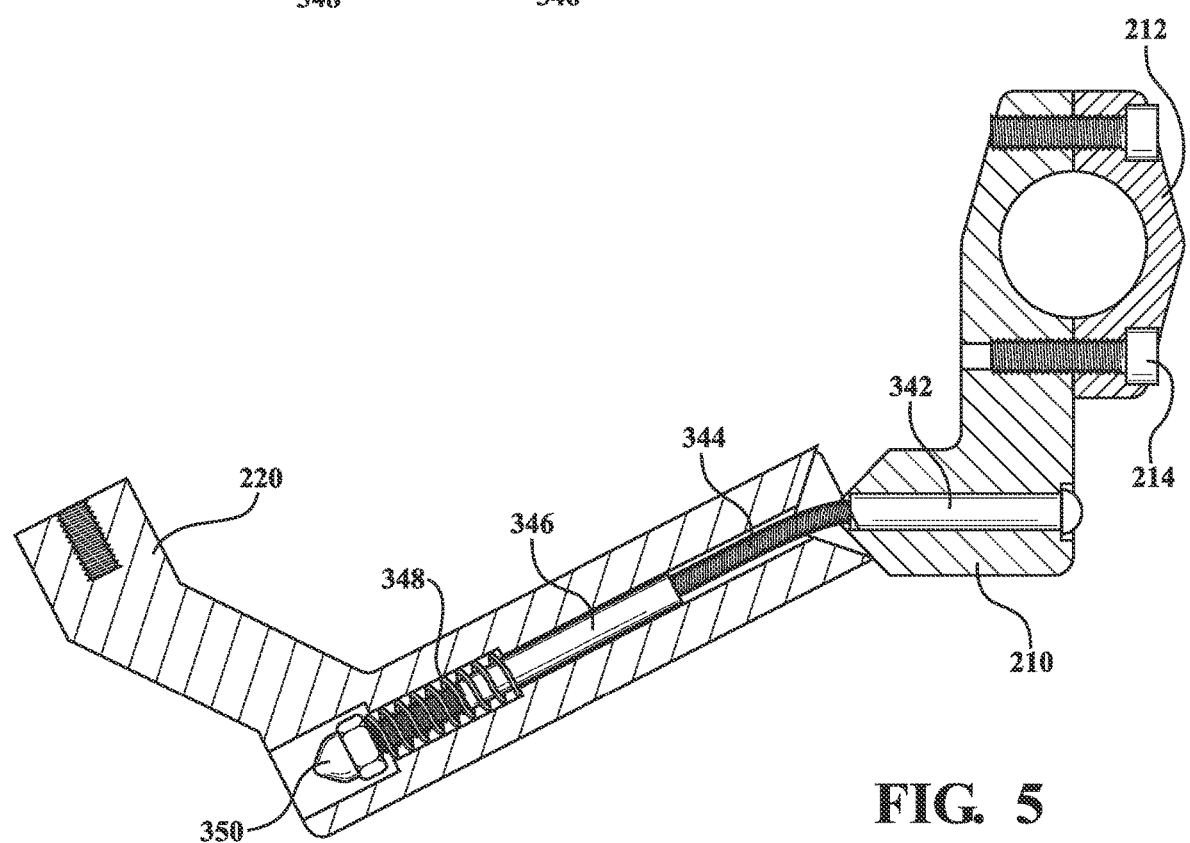
FIG. 5 is a cutaway view of an embodiment of a main chassis and attachment member in a deflected breakaway state.

FIG. 5 is a cutaway view of an embodiment of a main chassis and handlebar clamp attachment member, similar to those disclosed in FIGS. 1-4, in a deflected breakaway state. In this figure, in contrast to FIG. 4, the main chassis 220 is deflected downward in a breakaway state from an active force (e.g. an impact or crash). Increased compression is exhibited on the spring 348, based on the shortened length of the spring. The flexible middle portion 344 is shown as flexing to accommodate the change in relative position and orientation of the handlebar clamp attachment member 210 to the main chassis 220. It would be expected that following removal of the active force applied to deflect the main chassis 220 into its breakaway state, the main chassis 220 would re-position, re-orient and re-seat itself onto the handlebar clamp attachment member, thereby returning the handlebar clamp attachment member 210 and main chassis 220 to a standard state (shown in FIG. 4) due to the increased compression of the spring 348.

Similar to the handlebar mounted hand guard embodiments above, other embodiments (not shown) may be configured to function similarly. For example, in ATV embodiments, in addition to hand guards, side mirrors can be configured using the breakaway structures described above, wherein the shield assembly is replaced by a mirror assembly, allowing the side mirror to be struck by foreign objects, deflect until the force is removed, and then return to their original intended position. A mirror assembly can easily be substituted for a shield assembly, with the structure continuing to use a handlebar clamp assembly for attachment to handlebars.

Further, on vehicles which do not have handlebars, such as a side-by-side UTV off road vehicle, a handlebar clamp assembly may instead be incorporated into a main chassis, that is, with the main chassis directly attached to the body, roll cage or vehicle chassis with similar function and success regarding omni-directional breakaway deflection and self-orienting capabilities. Thus, while the above exemplary embodiments utilize a shield assembly and a handlebar clamp attachment assembly mounted to a handlebar, the shield assembly may be replaced with a different functional structure (e.g. side mirror, turn signal, protruding light, mount, etc) and the handlebar clamp attachment assembly may be replaced with another attachment assembly or incorporated into a main chassis (e.g. clamp or bolt onto a roll cage, flush mount to a body, bolt onto a frame, etc.).

Figure 6:
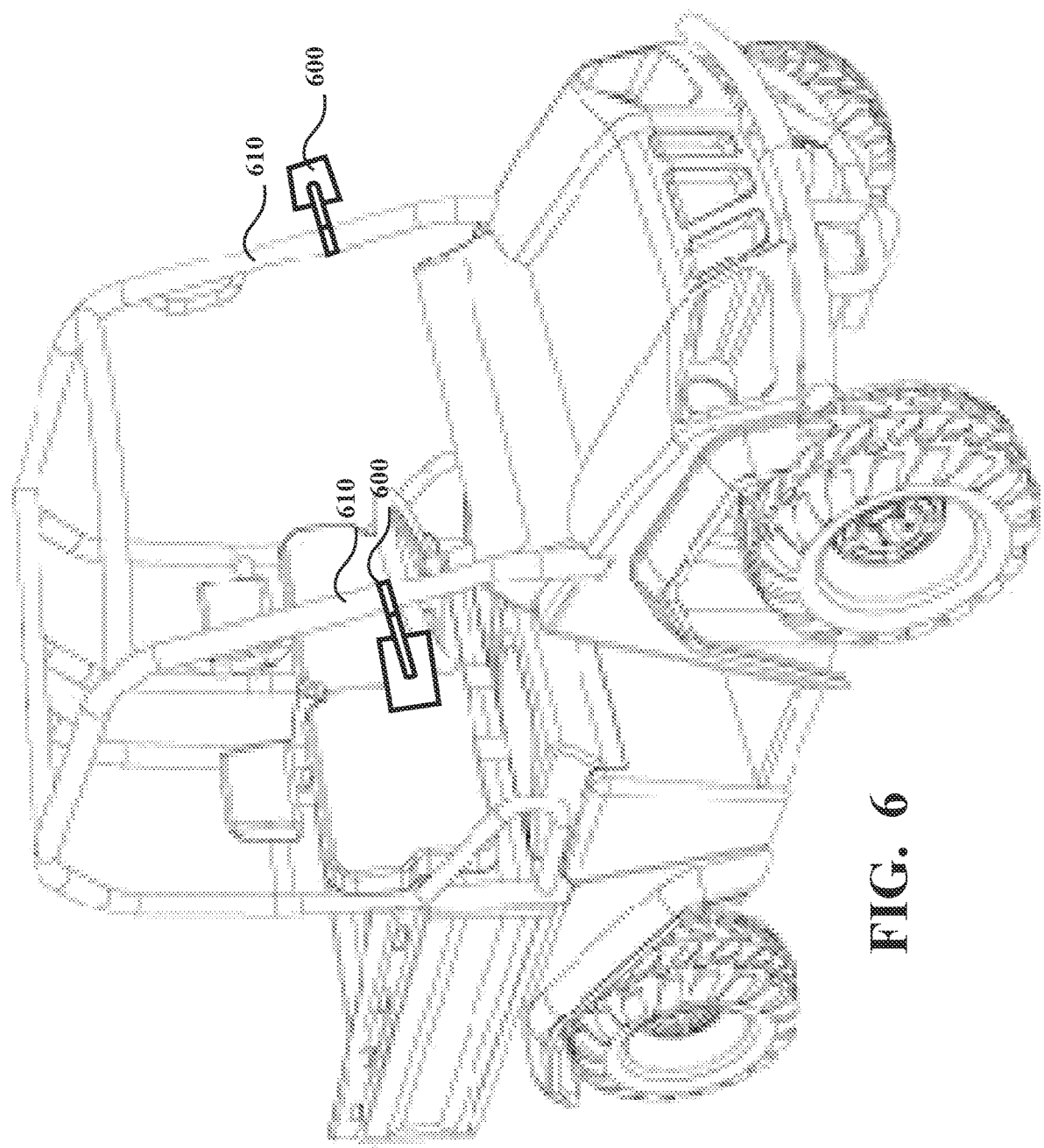
FIG. 6 is an environmental view of an embodiment of a pair of self-orienting breakaway mirrors mounted on the roll cage of a four-wheeled offroad vehicle.

FIG. 6 illustrates an embodiment of the present invention, namely one or more breakaway mirrors 600, mounted on the roll cage 610 of a side-by-side UTV off road vehicle.

Figure 7:
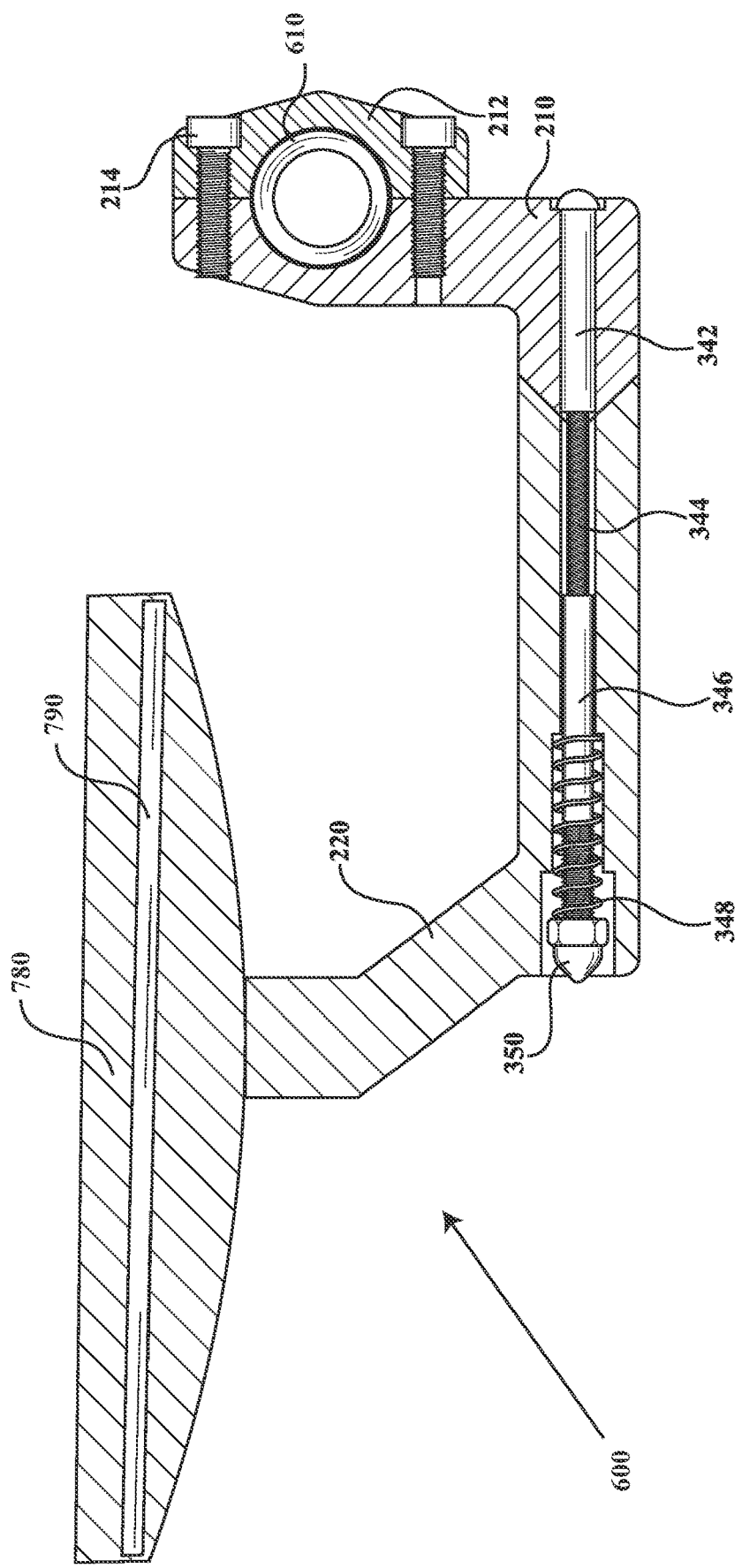
FIG. 7 is a cutaway view of an embodiment of a main chassis and clamp attachment member in a resting standard state.

FIG. 7, which resembles FIG. 4 in many respects with earlier described components, illustrates a breakaway mirror 600 further comprising a mirror assembly 780 and a mirror 790, replacing the shield attachment member 222 and a shield 230.

Additionally, rather than the clamp assembly 210 clamping to a handlebar, the clamp assembly 210 in FIG. 7 instead clamps to the roll cage 610.

To note, the mirror assembly 780 can be either attached to the main chassis 220 by conventional attachment means (e.g. bolt, rivot, adhesive, etc.), or alternatively may be incorporated into the same physical structure as the main chassis 220.

Figure 8:
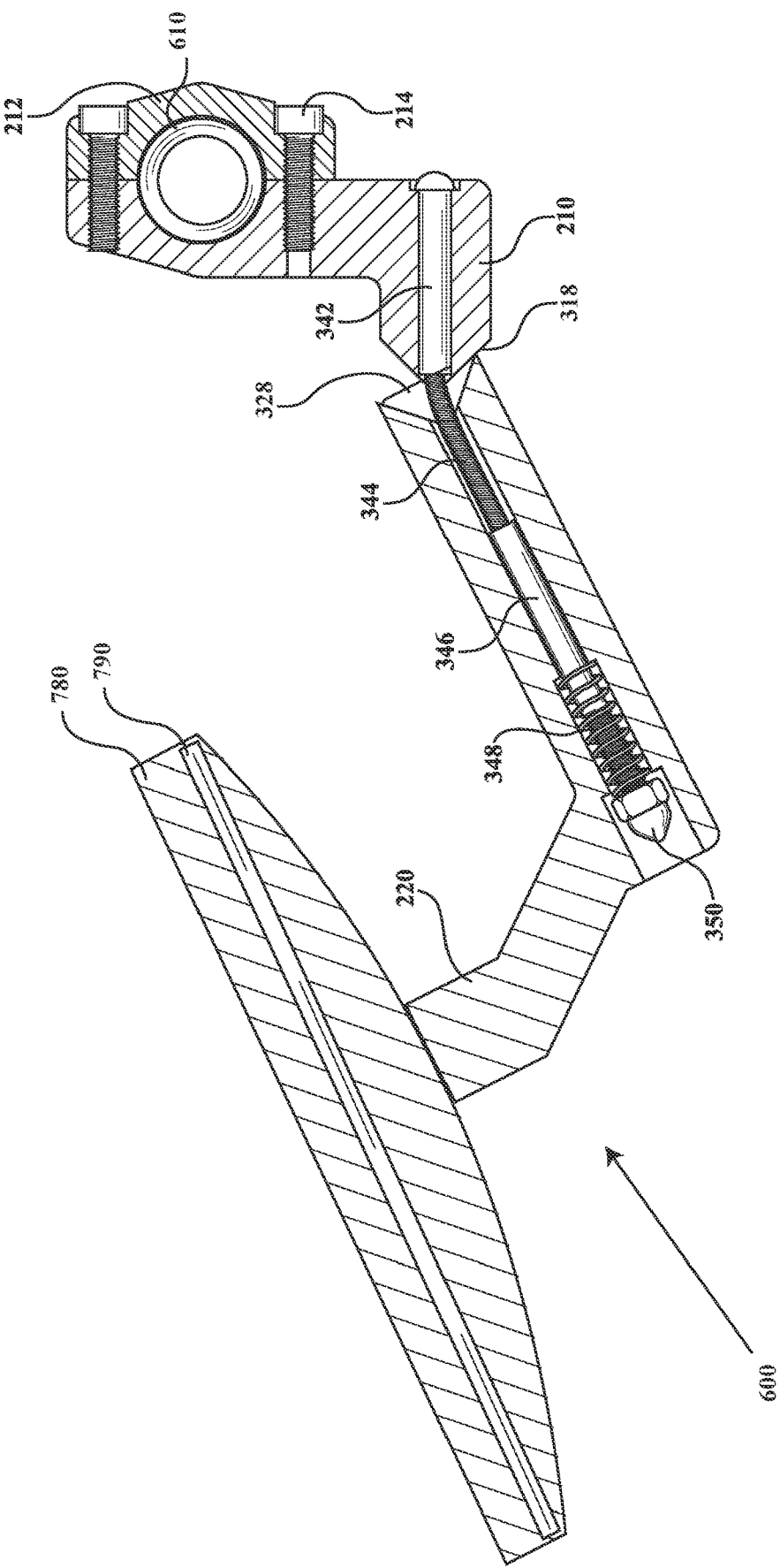
FIG. 8 is a cutaway view of an embodiment of a main chassis and clamp attachment member in a deflected breakaway state.

FIG. 8 resembles FIG. 7 in most respects, however the breakaway mirror 600 is in a deflected breakaway state. In this figure, in contrast to FIG. 7, the main chassis 220 is deflected downward in a breakaway state from an active force (e.g. an impact). Increased compression is exhibited on the spring 348, based on the shortened length of the spring. The flexible middle portion 344 is shown as flexing to accommodate the change in relative position and orientation of the clamp attachment member 210 to the main chassis 220. As further illustrated, the first mated surface 318 is no longer in mated orientation with the second mated surface 328. It would be expected that following removal of the active force applied to deflect the main chassis 220 into its breakaway state, the main chassis 220 would re-position, re-orient and re-seat itself onto the clamp attachment member, thereby returning the clamp attachment member 210 and main chassis 220 to a standard state (shown in FIG. 7) due to the increased compression of the spring 348.

In sum, practically any functional structure (e.g. shield, mirror, antenna, whip, etc.) that extends from the body, frame or chassis of a vehicle can utilize the breakaway structure advancements described above, namely with utilization of mated surfaces and a compression/tension core to achieve the desired omni-directional self-orienting breakaway function.

Assembly

Returning to FIG. 4, the assembly and configuration of the omni-directional self-orienting breakaway hand guard may be accommodated with the following steps.

- The shield attachment member 222 may be attached to the main chassis 220 with a shield attachment member bolts 224. Other attachment means may be used (e.g. pinning, press fit, adhesive, welding, etc.) without departing from embodiments.
- The shield 230 may be attached to the shield attachment member 222 with one or more shield attachment bolts 332. Other attachment means may be used (e.g. pinning, press fit, adhesive, welding, etc.) without departing from embodiments.
- The flexible middle portion 344 may be swaged to the first end 342. Other attachment means may be used (e.g. pinning, press fit, adhesive, welding, etc.) without departing from embodiments.
- The flexible middle portion 344 may be swaged to the second end 346. Other attachment means may be used (e.g. pinning, press fit, adhesive, welding, etc.) without departing from embodiments.
- The shaft assembly 340 may be inserted into and through the handlebar clamp attachment member 210, and thereafter into and through the main chassis 220. The spring 348 may be placed on the shaft assembly 340. The shaft assembly 340 may be secured in place with the nut 350. Other attachment means may be used (e.g. pinning, press fit, adhesive, welding, etc.) without departing from embodiments.
- The shaft assembly set screw 316 may be secured into the handlebar clamp attachment member 210 to secure the shaft assembly 340 to the handlebar clamp attachment member 210. Other attachment means may be used (e.g. pinning, press fit, adhesive, welding, etc.) without departing from embodiments.
- The handlebar clamp attachment member 210 may be secured to vehicle handlebars (as illustrated in FIG. 1) in a desired position and orientation using the handlebar clamp 212 using one or more handlebar clamp bolts 314. Other attachment means may be used (e.g. pinning, press fit, adhesive, welding, etc.) without departing from embodiments.

Literal Implementations

Disclosed is an omni-directional self-orienting breakaway side mirror mounted on a vehicle comprising: a clamp assembly attached to an exterior of the vehicle, the clamp assembly comprising a first mated surface; a main chassis comprising a second mated surface and a mirror assembly; a pair of mated surfaces comprising the first mated surface and the second mated surface, wherein the clamp assembly and main chassis communicate via the pair of mated surfaces; and a shaft assembly passing through the clamp assembly and main chassis, thereby creating elastic compression on the pair of mated surfaces as between the clamp assembly and main chassis, to place the mirror assembly in a desired position and orientation with respect to the clamp assembly, wherein the shaft assembly further comprises a first end, a flexible middle portion, and a second end. The flexible middle portion can be a cable. The flexible middle portion of cable can be swaged to the first end and second end. The second end of the shaft assembly can be threaded, and the shaft assembly further can comprise a nut to secure the shaft assembly within the main chassis. The shaft assembly can comprise a spring to provide elastic compression. The first mated surface is a plug and the second mated surface is a socket configured to accommodate the first mated surface. The first mated surface can be shaped as a multi-sided pyramid or more specifically a four-sided pyramid, and the second mated surface can be shaped to accommodate the first mated surface.

In another aspect, disclosed is a method of assembling an omni-directional self-orienting breakaway mirror for a vehicle, comprising steps of: providing a clamp assembly, the clamp assembly having a first mated surface; providing a main chassis, the functional structure having a second mated surface; providing a shaft assembly; installing the shaft assembly through the clamp assembly and main chassis, wherein the first mated surface and the second mated surface are in a mated configuration, wherein the clamp assembly and main chassis communicate under compression from the shaft assembly, thereby providing omni-directional breakaway of the first mated surface from the second mated surface. The main chassis can comprise a mirror assembly. The shaft assembly can comprise a first end, a second end and a middle flexible portion. The middle flexible portion can be a cable. The method can further comprise the steps of: swaging the cable to the first end and swaging the cable to the second end; attaching the clamp assembly to an offroad vehicle, preferably on the roll cage, wherein the vehicle may have four wheels.

CONCLUSION

There are numerous and diverse additional embodiments anticipated by the present invention. Therefore, it is further understood that the following examples are not limiting by nature, but rather alternate specific examples where the disclosed apparatus and method can be utilized.

The novel and useful approaches described herein evidence a variety of benefits over prior art approaches. In particular, embodiments of the present invention provide one or more additional aspects of enhanced convenience, usability and reliability over the prior art.

Preferred embodiments of this invention are described herein, including the best mode known to the inventors for carrying out the invention. As can be appreciated from the technical disclosure herein, embodiments of the present invention evidence a variety of advances and benefits over the prior art, uniquely and advantageously yielding savings of time, effort, and cost relative to the existing prior art currently utilized. Of course, variations on those preferred embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The terms "a" and "an" and "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the invention and does not pose a limitation on the scope of the invention otherwise claimed. No language in the specification should be construed as indicating any non-claimed element essential to the practice of the invention. Groupings of alternative elements or embodiments of the invention disclosed herein are not to be construed as limitations. Each group member may be referred to and claimed individually or in any combination with other members of the group or other elements found herein.

Furthermore, if any references have been made to patents and printed publications in this specification, then each of the above cited references and printed publications, if any, are herein individually incorporated by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

I claim:

1. An omni-directional self-orienting breakaway side mirror mounted on a vehicle comprising:
    a clamp assembly attached to an exterior of the vehicle, the clamp assembly comprising a first mated surface;
    a main chassis comprising a second mated surface and a mirror assembly;
    a pair of mated surfaces comprising the first mated surface and the second mated surface, wherein the clamp assembly and main chassis communicate via the pair of mated surfaces; and
    a shaft assembly passing through the clamp assembly and main chassis, thereby creating elastic compression on the pair of mated surfaces as between the clamp assembly and main chassis, to place the mirror assembly in a desired position and orientation with respect to the clamp assembly, wherein the shaft assembly further comprises a first end, a flexible middle portion, and a second end.

2. The omni-directional self-orienting breakaway side mirror of claim 1 wherein the flexible middle portion is a cable.

3. The omni-directional self-orienting breakaway side mirror of claim 2 wherein the flexible middle portion of cable is swaged to the first end and second end.

4. The omni-directional self-orienting breakaway hand guard of claim 1 wherein the second end of the shaft assembly is threaded, and the shaft assembly further comprises a nut to secure the shaft assembly within the main chassis.

5. The omni-directional self-orienting breakaway side mirror of claim 1 wherein the shaft assembly comprises a spring to provide elastic compression.

6. The omni-directional self-orienting breakaway side mirror of claim 1 wherein the vehicle that the self-orienting breakaway side mirror is attached to is a four-wheel off-road vehicle.

7. The omni-directional self-orienting breakaway side mirror of claim 6 wherein the breakaway side mirror is attached to a roll cage of the four-wheel offroad vehicle.

8. The omni-directional self-orienting breakaway side mirror of claim 1 wherein the first mated surface is a plug and the second mated surface is a socket configured to accommodate the first mated surface.

9. The omni-directional self-orienting breakaway hand guard of claim 1 wherein the first mated surface is shaped as a four-sided pyramid, and the second mated surface is shaped to accommodate the first mated surface.

10. The omni-directional self-orienting breakaway hand guard of claim 1 wherein the first mated surface is shaped as a multi-sided pyramid, and the second mated surface is shaped to accommodate the first mated surface.

11. A method of assembling an omni-directional self-orienting breakaway mirror for a vehicle, comprising steps of:
    providing a clamp assembly, the clamp assembly having a first mated surface;
    providing a main chassis, a functional structure having a second mated surface;
    providing a shaft assembly;
    installing the shaft assembly through the clamp assembly and main chassis, wherein the first mated surface and the second mated surface are in a mated configuration, wherein the clamp assembly and main chassis communicate under compression from the shaft assembly, thereby providing omni-directional breakaway of the first mated surface from the second mated surface.

12. The method of claim 11, wherein the main chassis comprises a mirror assembly.

13. The method of claim 11, wherein the shaft assembly comprises a first end, a second end and a middle flexible portion.

14. The method of claim 13, wherein the middle flexible portion is a cable.

15. The method of claim 14, further comprising the step of swaging the cable to the first end and swaging the cable to the second end.

16. The method of claim 11, further comprising the step of attaching the clamp assembly to the vehicle which is an off-road vehicle.

17. The method of claim 11, further comprising the step of attaching the clamp assembly to the vehicle which is a four-wheeled off-road vehicle.

18. The method of claim 11, further comprising the step of attaching the clamp assembly to a roll cage of the vehicle which is a four-wheeled off-road vehicle.

19. The method of assembling an omni-directional self-orienting breakaway hand guard of claim 11 wherein the shaft assembly comprises a first end, a second end and a middle flexible portion, wherein the middle flexible portion is a cable, the method further comprising steps of: (i) swaging the cable to the first end and, (ii) swaging the cable to the second end.

* * * * *